Sept. 4, 1951

M. L. LESNICK 2,566,669

DISPENSING NOZZLE WITH MEASURING CHAMBER AND
COUNTER, MEANS FOR NONREMOVABLE ATTACHMENT
TO A BOTTLE NECK AND VALVED DISPENSING
AND VENT OUTLETS FOR SAID CHAMBER

Filed April 17, 1946

INVENTOR.
MAX L. LESNICK

BY
Kwis, Hudson, Boughton & Williams
ATTORNEYS

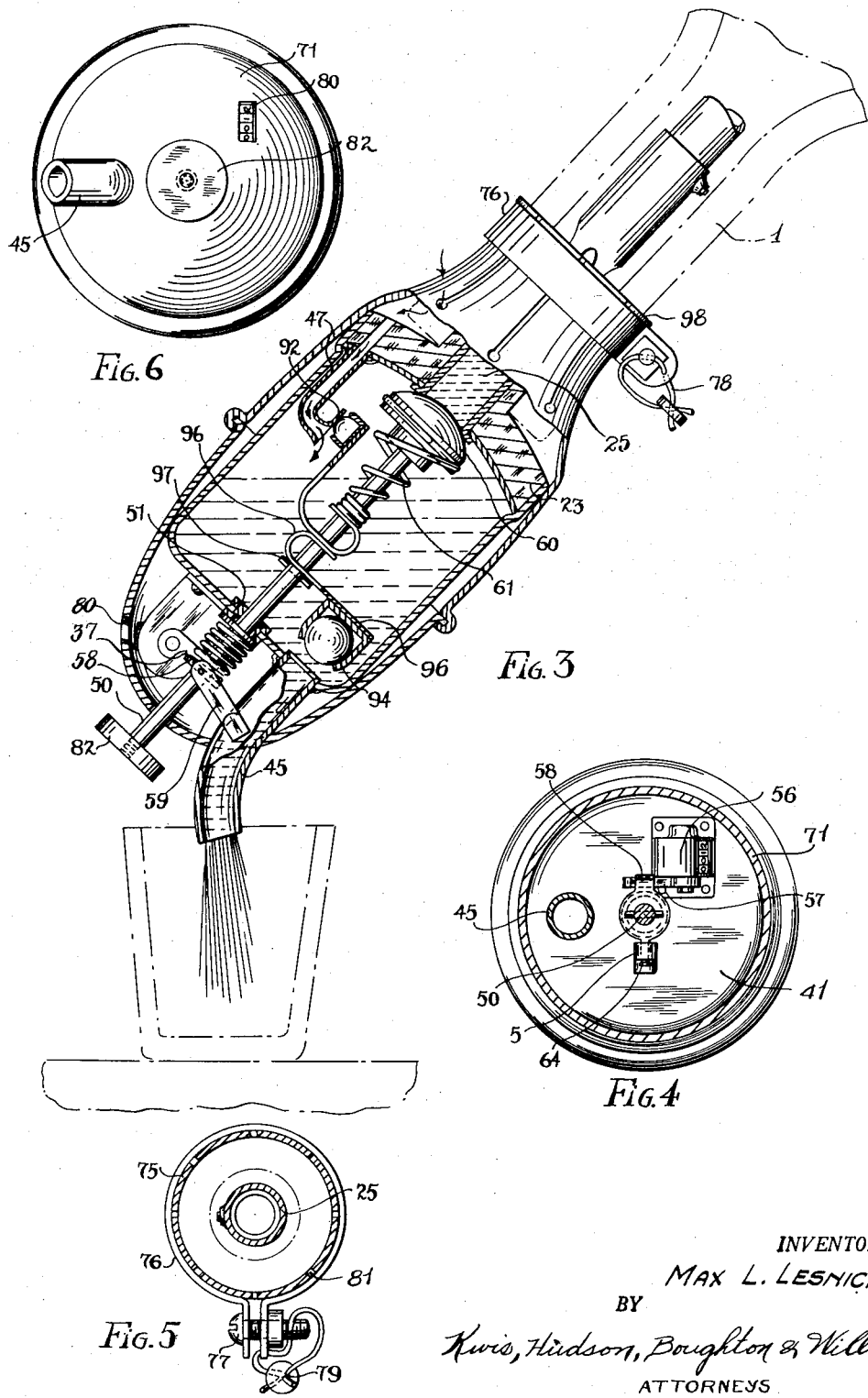

UNITED STATES PATENT OFFICE 2,566,669

DISPENSING NOZZLE WITH MEASURING CHAMBER AND COUNTER, MEANS FOR NONREMOVABLE ATTACHMENT TO A BOTTLE NECK, AND VALVED DISPENSING AND VENT OUTLETS FOR SAID CHAMBER

Max L. Lesnick, Cleveland, Ohio

Application April 17, 1946, Serial No. 662,740

3 Claims. (Cl. 222—153)

This invention pertains to the art of liquid dispensing, and more particularly to a device adapted to be attached to a liquid container for dispensing measured amounts of liquid and, if desired, recording the number of measured portions dispensed.

One of the principal objects of this invention is the provision of a new and novel device adapted to be attached to a liquid container, comprising a chamber for measuring the size of a portion to be dispensed, an inlet for admitting liquid from the container to the measuring chamber, an outlet for pouring the liquid from the chamber, and valve means for controlling the flow of liquid through the inlet and outlet, so constructed and arranged that the inlet valve must be closed before the outlet valve may be opened.

Another object of this invention is the provision of a novel and improved apparatus for attachment to a liquid container, comprising a measuring chamber, an inlet for admitting liquid from the container to the chamber, an outlet for dispensing the liquid from the chamber, valves for controlling the flow of liquid through the inlet and the outlet, and a valve operating member, the initial movement of which closes the inlet valve and subsequent movement opens the outlet valve.

Still another object of this invention is the provision of a new and improved device for serving measured portions from a liquid containing bottle, which device comprises a measuring chamber, inlet and outlet ports, an air vent communicating with said chamber and exteriorly of the bottle to permit air to enter and replace the liquid dispensed through the outlet port, and interconnected valve means for said inlet, outlet, and air vent ports, so arranged that the inlet valve must be closed before the outlet and air vent valves may be opened.

Another object of this invention is the provision of a new and novel device for serving measured portions from a liquid containing bottle, comprising a measuring chamber, inlet and outlet valves for controlling the flow of liquid into and out of the measuring chamber, a shaft for operating the valves, and means for preventing operation of the valves except when the apparatus is in the pouring position.

Still another object of this invention is the provision of a new and novel apparatus for dispensing measured portions from a liquid containing bottle, which apparatus includes a counter for recording the number of portions dispensed.

Still another object is the provision of a new and novel device having a measuring chamber for measuring the volume of liquid to be dispensed, a counter for recording the number of portions dispensed, and means for preventing operation of the counter except when the apparatus is in the pouring position.

A further object is the provision of a new and novel apparatus for dispensing measured portions of liquid from a liquid containing bottle, comprising a measuring chamber, an inlet port through which liquid from the container can be supplied to the measuring chamber, an outlet port through which the liquid in the measuring chamber can be dispensed, valves for controlling the flow of liquid into and out of the measuring chamber, and a counter interconnected with the valves to record the number of measured portions served.

A further object is the provision of a new and novel apparatus for dispensing measured portions of liquid from a liquid containing bottle, comprising a measuring chamber, an inlet port through which liquid from the container can be supplied to the measuring chamber, an outlet port through which the liquid in the measuring chamber can be dispensed, valves for controlling the flow of liquid into and out of the measuring chamber, a valve operating shaft for opening and closing said valves, a counter interconnected with the shaft to record the number of times the valves are operated, and thus the number of portions served, and a gravity operated arm on said shaft to prevent operation thereof unless the apparatus is in the pouring position.

Still another object is the provision of a new and novel apparatus for attachment to a liquid containing bottle for measuring the volume of and recording the number of portions served from the bottle, comprising a housing, a plurality of fingers on said housing sufficiently resilient to pass over a lip on the neck of the bottle to which it is to be attached, a clamp to surround said fingers and hold them in firm engagement with the neck of the bottle and prevent repassage over the lip, and means for preventing surreptitious removal of the clamp.

Still another object is to provide a new and novel apparatus for dispensing measured amounts of liquid from a bottle and preventing refilling of the bottle, comprising a measuring chamber having inlet and outlet controlling valves, and an extension to pass through the neck of the bottle having collapsible means on the end for permitting easy insertion thereof but preventing removal without breaking the bottle.

Fig. 3 is a view similar to Fig. 1, showing the drink dispensing device in the pouring position dispensing a measured amount of liquid.

Fig. 4 is a sectional view on the line 4—4 of Fig. 2, showing additional detail of the counter and shaft locking means.

Fig. 5 is a sectional view on the line 5—5 of Fig. 2, and,

Fig. 6 is a top plan view of the liquid dispensing apparatus.

Figure 1:
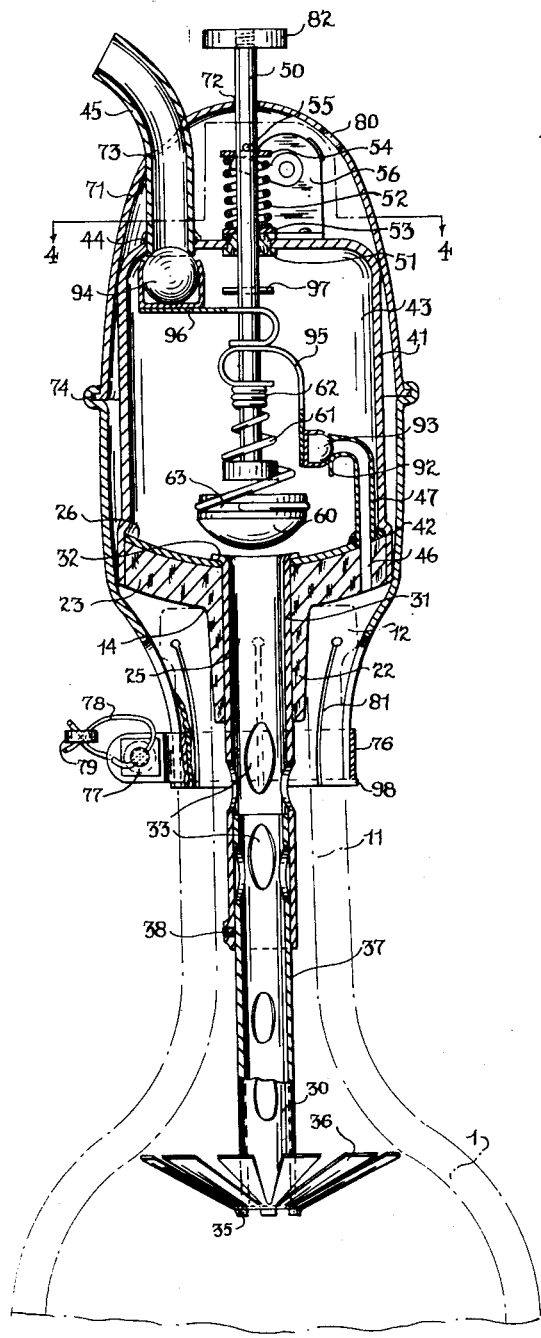
Fig. 1 is a sectional view on the line 1—1 of Fig. 2, showing a liquid dispensing device embodying the present invention mounted on a liquid containing bottle.
Figure 2:
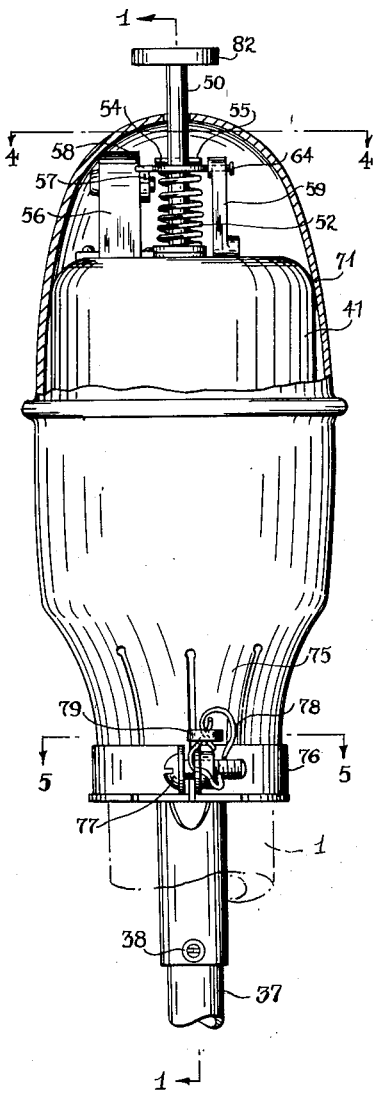
Fig. 2 is an external view with the housing in part broken away showing details of the arrangement of the counter, means for preventing operation of the valves when the bottle is in upright position, and the means for securely mounting the device on the bottle.

While my liquid dispensing apparatus can by suitable modifications be mounted on any type of a liquid containing bottle, of glass or otherwise, or may be remotely situated thereto and connected by suitable fluid conduits, it is shown as mounted on a beverage containing bottle 1 of the usual glass kind, having a neck 11 and a lip 12.

My drink dispensing apparatus may take a number of different forms and may be mounted on the beverage containing bottle in a number of different ways. However, in the embodiment shown, a cork 22 having a pouring hole 25 therethrough is inserted into the open end of the neck until the cork flange 23 engages the shoulder 14 on the neck of the bottle. To give the flange suitable rigidity and strength, a flange supporting plate 26 is suitably held in supporting engagement therewith. If desired, suitable glues or other adherents may be used to bind the two together indestructibly.

Suitably mounted and attached to the flange and the supporting plate is a cup-shaped receptacle 41 having a shoulder or stop 42 to engage the flange supporting plate and insure that the size of the chamber 43 formed by the receptacle and the flange supporting plate will always be the same. The size of the receptacle 41 may be made of any size, depending upon the volume of liquid it is desired to dispense in each portion. It must, of course, be appreciated that in calculating the size of the receptacle for the particular size portion to be dispensed, the volume and displacement of the valves and the valve operating mechanism which are also within the chamber must be taken into account. If desired, the cup-shaped receptacles may all be formed of uniform size and the final volume to be dispensed controlled by means of bulkheads or partitions (not shown) suitably mounted interiorly of the receptacle in sealing engagement with the sides thereof. Alternatively, balls or other solid objects of the appropriate volume may be inserted at the time of manufacture.

In the embodiment shown, the receptacle is provided at one end with an opening or aperture 44 in which is mounted a nozzle 45. While the length of this nozzle may be of any length and shape so as to convey the measured liquid from the measuring chamber to the container in which it is to be poured, it is shown as being relatively short and as having approximately a 45 degree bend therein.

In order to permit air to enter the measuring chamber to replace the liquid being dispensed through the nozzle 45 when the dispensing apparatus is in the pouring position as shown in Fig. 3, an air vent should be provided. In the embodiment shown this vent consists of a vent 46 through the cork flange 23 and the flange supporting plate 26. A suitable tube 47 having a bend 91 to place its opening at right angles to the operating shaft 50 places the outlet of the vent in a suitable position where it may be controlled by a valve member on the shaft. A skirt 92 is also provided upon which the valve may rest when in the open position.

It will be appreciated that to successfully operate my liquid dispensing apparatus some means must be provided whereby the pouring hole in the cork, the opening of the nozzle into the measuring chamber, and the opening of the air vent on the tube 47 may be suitably controlled so that the latter two openings cannot be opened until the pouring hole is tightly closed.

In the embodiment shown, an operating shaft 50 having an operating button 82 is slidably mounted through an opening in the wall of the receptacle 41 which is suitably sealed with packing 51. Resilient means such as the coil spring 52 bearing on a washer 53 situated on top of the packing 51, and another washer 54 mounted on the shaft, continuously urge the shaft to an extended or non-dispensing position. A pin 55 inserted through a suitable opening in the shaft transmits the force of the spring on the washer 54 to the shaft.

Suitably and movably mounted with respect to the shaft is a valve member 60 for closing off the pouring hole 25. In the embodiment shown, this valve is supported in spaced position from the end of the shaft 50 by means of the helical coil spring 61 attached to the shaft at 62 by suitable means. The valve member is provided with a suitable groove 63 in its outer surface to receive one or more turns of the end of the coil spring. By mounting the valve in this manner it will thus be seen that the shaft 50 on its initial movement will close the valve and yet is capable of considerable movement after it is closed.

An air vent valve 93 and a nozzle controlling valve 94 are supported in suitable position adjacent their ports by the brackets 95 and 96 respectively, which are slidably mounted on the operating shaft 50. The reverse bend as shown provides lateral support. The dimensions of these brackets and the position of attachment of the helical coil spring 61 to the shaft are so proportioned that when the operating shaft is in the extended position, as shown in Fig. 1, the two valves will be in the closed position.

In the closed position, the air vent valve 93 projects a short way into the opening in the air vent and serves as a stop to hold the valve members in closed position during the initial movement of the operating shaft, which closes the valve 60. Subsequent movement brings the pin 97 into engagement with the top of the bracket 96 and thus forces the air vent valve and the nozzle valve to open, the air vent valve riding on the skirt 92 or the air vent tube in the open position. Thus the locking action, which serves to hold these valves closed until forcefully opened, does not operate in the opposite direction, and upon initial movement of the operating shaft to the extended position these valves will close due to the friction normally present between the brackets and the shaft. However, if they fail to do so the portion 62 on the helical spring serves as a stop and will force them into the closed position, although possibly a short moment after the inlet valve has been opened.

Suitable means for counting or recording the number of measured portions which have been dispensed are provided. In the embodiment shown, a counter 56, either of the conventional type or one modified to fit into the small space available, is provided. The counter may record to as high a number as necessary, but in the embodiment shown it is so made as to go up to 9999. Preferably the counter is mounted on the top of the receptacle 41 by means of rivets or otherwise, so positioned that its operating arm 57 extends to a position under a suitable tab 58 on the washer 54. Thus, every time the shaft 50 is operated to dispense a measured portion the counter will be advanced by one number.

To prevent operation of the counter arm, except when the bottle and the dispenser are in the dispensing position as shown in Fig. 3, suitable means are provided. While this may take a variety of forms, it is shown as a pendulous locking arm 59 pivotally mounted on a suitable shaft 64 formed integrally with the washer 54. The length of this arm is so formed that when the operating shaft is in the extended position as urged by the resilient spring 52, the arm will just clear the top surface of the receptacle 41, thus preventing movement of the operating shaft. However, when it is desired to dispense a drink and the bottle and the dispenser are tipped to the dispensing position as shown in Fig. 3, the arm 59 by the force of gravity will pivot to a position as shown such that the shaft 50 can be readily operated.

To prevent tampering with the mechanism of the dispenser and to provide an apparatus which will have an appearance suitable to being placed on display, a housing 71 having an opening 72 for the operating shaft, an opening 73 for the nozzle, and an opening 80 to permit reading of the counter is provided which completely encloses the mechanism of the dispensing apparatus and is sealed on the neck of the bottle. The housing is preferably formed of two pieces and is integrally held together by means of the flanged joint 74. It may be either loose with respect to the measuring mechanism or it may be bonded by means of welding, brazing, or otherwise at the points of contact between the outer surface of the receptacle and the inner surface of the housing.

To allow the housing to slip over the lip 12 of the neck of the bottle and yet be bonded snugly thereon, slots 81 are formed in the lower part of the housing to provide suitable resilient fingers 75. Suitable means such as the C-clamp 76 compressed by the nut and bolt 77 are provided, to insure rigidity of mounting and to prevent surreptitious removal of the dispensing apparatus from the bottle. A wire or otherwise 78 is then inserted through a suitable hole in the bolt and the ends permanently joined together by means of a soft lead pellet 79. A flange 98 on the end of the fingers holds the clamp in position.

In the liquor industry difficulty has been experienced with the proprietors of the establishments where the liquor is dispensed by the drink, in that they refill bottles having expensive labels with liquor of an inferior grade or brand. To prevent this, attaching means, shown generally at 30, is provided which makes it impossible to remove the liquid dispensing apparatus from the bottle without destroying the bottle. A tube or arm 31 joined to the flange support plate 26 by suitable means, such as flaring over at the end of the tube as at 32 extends into the neck of the bottle. In order to provide an adjustment for different sizes or shapes of bottles, another tube 37 may be telescoped therewith. Preferably a set screw 38 is provided to make the adjustment of the length of the telescoping members fixed. The tubes may be provided with a plurality of apertures 33 so as to permit the liquid in the bottle to quickly and readily flow into the interior of the tube and thereby have access to the measuring chamber 43 which will be described hereinafter. Suitably mounted on the end of the tube 37 is a plate or disc 35 having a plurality of resilient fingers 36 flexible in one direction only and biased such that they may be easily inserted through the neck of the bottle but cannot be removed therefrom without smashing the bottle.

In operation, the length of the pouring tube is first adjusted by means of the set screw 38 to fit the type and size of bottle upon which the dispenser will be mounted. The tube is inserted through the mouth of the bottle, the resilient fingers 36 collapsing sufficiently to permit such passage and subsequently widening out to engage the inner surface of the bottle and prevent removal without first smashing the bottle. The resilient fingers 75 also spring outwardly sufficiently to permit passage over the lip 12. The C-clamp 76 is then placed over the fingers, the nut and bolt 77 drawn tight, the wire 78 inserted, and the ends sealed by means of the lead pellet 79. The number on the counter is then recorded.

To dispense a drink, the bottle and the dispenser are first tilted as a unit whereby the locking arm 59 pivots out of its locking position and liquid can pass through the pouring hole 25 through the normally open valve 60 into the measuring chamber 43. The pouring hole should be sufficiently large that any air in this chamber can readily escape through it into the bottle. After a sufficient interval of time to insure that the measuring chamber is completely filled, the operating shaft 50 is operated by pressing on the operating button 82 which first moves the valve 60 to closed position, thereby sealing off the pouring hole and upon subsequent movement opens the valve 94 to the nozzle and the valve 93 to the air vent, thereby permitting the liquid to flow by force of gravity through the nozzle into any container desired. Air, to make up for the volume of the liquid dispensed, may enter through the air vent. At the same time the recorder 56 is advanced one number. Release of the operating button closes off the opening to the nozzle and the air vent, reopens the pouring hole valve 60 to permit refilling of the measuring chamber 43, and resets the counter.

While the measuring container and the other portions which may be exposed to the liquid which it is desired to measure may be of any material such as a plastic, synthetic resin, or metal, I have found that in order to avoid any unnatural or foreign flavors being introduced into the liquid, stainless steel is preferable for the metallic parts of the dispenser. The housing may also be made of any desired material, but for permanence, appearance, and resistance to rust and tarnishing, should also preferably be made of stainless steel.

While by way of illustration and example I have described my invention in connection with a preferred embodiment thereof as to structure and the preferred manner of its use, it will be obvious to those skilled in the art after understanding the foregoing that various changes and modifications may be made without departing from the spirit or the scope of the invention, and it is my desire in the appended claims to cover all such modifications and changes.

Having thus described my invention, I claim:

1. In a beverage dispensing apparatus adapted to be attached to a beverage container and dispense measured portions therefrom, a measuring chamber, means for mounting the measuring chamber on a container, said chamber having an inlet port adapted to communicate with the container, an outlet port for dispensing the beverage in the chamber, inlet and outlet imperforate valve means controlling the flow of beverage through the ports, and a valve operating member for operating said valve means, said inlet valve means being resiliently attached to and spaced beyond one end of the valve operating member whereby continued movement of the valve operating member is permitted after the inlet valve means are closed, and means on the operating member for engaging the outlet valve means after the inlet valve has closed to open the outlet valve means.

2. In a beverage dispensing apparatus for attachment to a beverage container to dispense measured amounts of beverage therefrom, a measuring chamber, an inlet port for supplying beverage to the chamber, and an outlet port for dispensing the measured amount of beverage therefrom, valve members for controlling the flow of beverage through said ports, a valve operating member, and means preventing the operation of said valves except when the apparatus is in the dispensing position, said means comprising a pendulous arm pivotally supported adjacent one end, portions of said arm when said apparatus is in the non-dispensing position being disposed intermediate portions of said valve operating member and said apparatus for preventing movement of said valve operating member, said arm swinging relative to said apparatus upon tilting thereof out of said non-dispensing position whereby to permit actuation of said valve operating member.

3. In a beverage dispensing apparatus for attachment to a beverage container to dispense measured amounts of beverage therefrom, a measuring chamber, an inlet port for supplying beverage to the chamber, and an outlet port for dispensing the measured amount of beverage therefrom, valve members for controlling the flow of beverage through said ports, a valve operating member, and means preventing the operation of said valves except when the apparatus is in the dispensing position, said means comprising a pendulous arm pivotally supported at one end on said member, said arm having a length such as to engage said apparatus when the apparatus is in the non-dispensing position to prevent operation of the valves and pivoting out of said engagement when the apparatus is tilted to the dispensing position.

MAX L. LESNICK.

REFERENCES CITED

The following references are of record in the file of this patent:

UNITED STATES PATENTS

| Number | Name | Date |
| --- | --- | --- |
| 692,848 | Goodman | Feb. 11, 1902 |
| 920,338 | Hunt | May 4, 1909 |
| 1,027,421 | Jungclas | May 28, 1912 |
| 2,093,365 | Ransom et al. | Sept. 14, 1937 |
| 2,106,649 | Officer | Jan. 25, 1938 |
| 2,158,948 | Rubens | May 16, 1939 |
| 2,199,312 | Henry | Apr. 30, 1940 |
| 2,363,747 | Reece et al. | Nov. 28, 1944 |

FOREIGN PATENTS

| Number | Country | Date |
| --- | --- | --- |
| 27,403 | Denmark | Apr. 4, 1921 |